(12) United States Patent
Prior et al.

(10) Patent No.: US 10,765,200 B2
(45) Date of Patent: Sep. 8, 2020

(54) BARBEQUE CHAIN BRUSH

(71) Applicant: Archipelago Group LLC, Lakewood, CO (US)

(72) Inventors: Bruce Prior, Lakewood, CO (US); George Prior, Culver City, CA (US)

(73) Assignee: Archipelago Group LLC, Lakewood, CO (US)

( * ) Notice: Subject to any disclaimer, the term of this patent is extended or adjusted under 35 U.S.C. 154(b) by 167 days.

(21) Appl. No.: 15/698,411

(22) Filed: Sep. 7, 2017

(65) Prior Publication Data

US 2019/0069667 A1    Mar. 7, 2019

(51) Int. Cl.
| | |
|---|---|
| *A46B 15/00* | (2006.01) |
| *A47L 13/34* | (2006.01) |
| *A46B 5/00* | (2006.01) |
| *A47J 37/07* | (2006.01) |
| *A47L 25/12* | (2006.01) |
| *A46B 9/00* | (2006.01) |

(52) U.S. Cl.
CPC ........ *A46B 15/0055* (2013.01); *A46B 5/0095* (2013.01); *A46B 9/005* (2013.01); *A46B 15/0081* (2013.01); *A47J 37/0786* (2013.01); *A47L 13/34* (2013.01); *A47L 25/12* (2013.01); *A46B 2200/3033* (2013.01)

(58) Field of Classification Search
CPC .......... A47L 13/02; A47L 13/06; A47L 13/08; A47L 17/06; A47L 25/00; A46B 2200/3093; A47J 37/0786
USPC ..... 15/207.2, 200, 236.08, 236.09, 239, 111, 15/229.11; 30/169
See application file for complete search history.

(56) References Cited

U.S. PATENT DOCUMENTS

| | | | |
|---|---|---|---|
| 2,207,330 A | 7/1940 | Osburn | |
| 2,265,192 A | 12/1941 | Alphonce | |
| 5,735,014 A | 4/1998 | Noga | |
| 6,000,739 A | 12/1999 | Zemit et al. | |
| 6,141,999 A | 11/2000 | Whittaker et al. | |
| 8,683,641 B2 * | 4/2014 | Weinberger | A47J 43/288 15/111 |
| 9,227,301 B2 | 1/2016 | Weinberger et al. | |
| 9,408,458 B2 | 8/2016 | Woods | |
| 2014/0331424 A1 * | 11/2014 | Gonzalez | A46B 3/18 15/111 |

FOREIGN PATENT DOCUMENTS

CA    3012798 A1 *    4/2019    .......... A47J 37/0786

* cited by examiner

*Primary Examiner* — Monica S Carter
*Assistant Examiner* — Abbie E Quann
(74) *Attorney, Agent, or Firm* — Olav M. Underdal; IDP Patent Services

(57) ABSTRACT

A barbeque chain brush includes a handle; a shaft; a brush head; including a brush head base, chain segments including connected chain links, and a brush skirt; such that the barbeque chain brush can be used to scrub a surface of a barbeque grill. The chain segments can be square or round, made from a non-corrosive metal, and can be configured as single or double chain segments, with particular width, length, and density ranges.

20 Claims, 5 Drawing Sheets

Barbeque Chain Brush

Barbeque Chain Brush

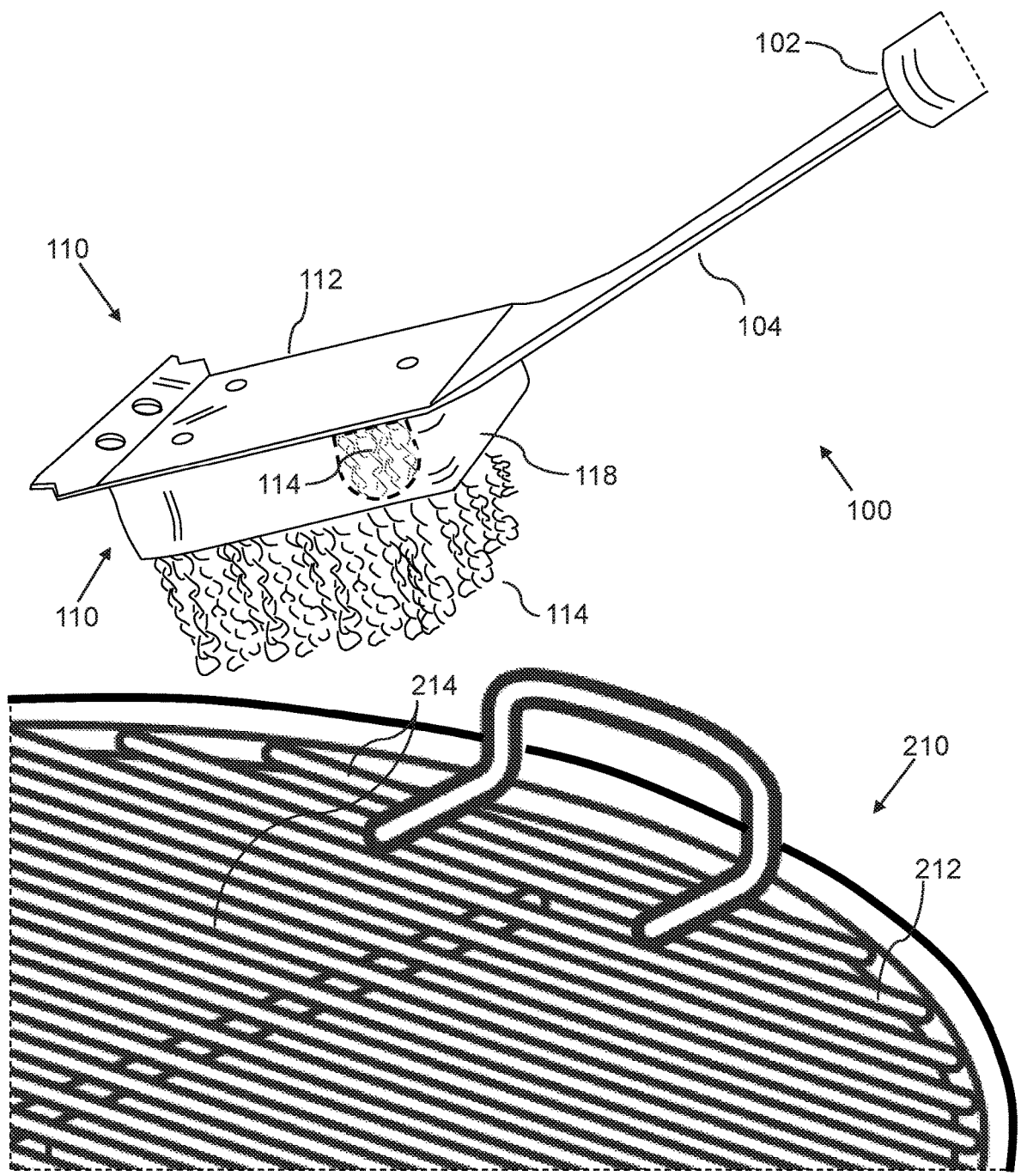

Single Chain Segment

Double Chain Segment

Square Chain Segment

Round Chain Segment

BARBEQUE CHAIN BRUSH

CROSS-REFERENCE TO RELATED APPLICATIONS

N/A.

FIELD OF THE INVENTION

The present invention relates generally to the field of barbeque cleaning, and more particularly to methods and devices for barbeque brushes.

BACKGROUND OF THE INVENTION

Conventional grill brushes that use metal wire bristles and other grill scrubbing tools are well-known for use in cleaning of domestic barbeque grills.

Conventional grill brushes may occasionally lose individual wire bristles, which can cause a serious health hazard. Consumers can unknowingly swallow these tiny, sharp bristles, causing serious harm to interior organs, for example such that the sharp bristles may perforate throat, stomach, and intestines.

Further, conventional grill brushes quickly wear out and stop working well. Wire bristle brushes quickly become matted and only clean the top surface of the grill grate.

As such, considering the foregoing, it may be appreciated that there continues to be a need for novel and improved devices and methods for grill brushes for use in cleaning of barbeque grills.

SUMMARY OF THE INVENTION

The foregoing needs are met, to at least a great extent, by the present invention, wherein in aspects of this invention, enhancements are provided to the existing model of for grill brushes for use in cleaning of barbeque grills.

In an aspect, a barbeque chain brush can include:
a brush head, including:
  a brush head base; and
  a plurality of chain segments, such that an upper end of each chain segment is connected to the brush head base, such that each chain segment, comprises:
    a plurality of connected chain links;
such that the barbeque chain brush can be used to scrub a surface of a barbeque grill.

In a related aspect, the barbeque chain brush can further include:
a) a handle; and
b) a shaft, such that the handle is mounted on a first end of the shaft;
such that the brush head base is connected to a second end of the shaft.

In a related aspect, the barbeque chain brush can further include:
a brush skirt, which is mounted around an upper part of the plurality of chain segments;
such that the brush skirt is configured to stabilize the plurality of chain segments.

In a related aspect, each chain segment in the plurality of chain segments can configured as a single chain, such that an upper end of the single chain is connected to the brush head base, and a lower end of the single chain is exposed.

In a related aspect, each chain segment in the plurality of chain segments can be configured as a double chain, such that first and second ends of the double chain are connected to the brush head base, such that a middle part of the double chain is configured to be a lowest part of the double chain.

In a related aspect, each connected chain link in the plurality of connected chain links can be made from a square wire, wherein the square wire is configured with sharp edges, whereby the barbeque chain brush is configured to effectively scrape off grease and dirt from a surface of the barbeque grill.

In a related aspect, each connected chain link in the plurality of connected chain links can be made from a round wire, wherein the round wire is configured with a rounded surface, whereby the barbeque chain brush is configured to remove grease and dirt from a surface of a barbeque grill, while minimizing risk of creating scratch marks and scuffs on the surface of the barbeque grill.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a perspective view of a barbeque chain brush in use on a barbeque grill, according to an embodiment of the invention.

DETAILED DESCRIPTION

Figure 1A:
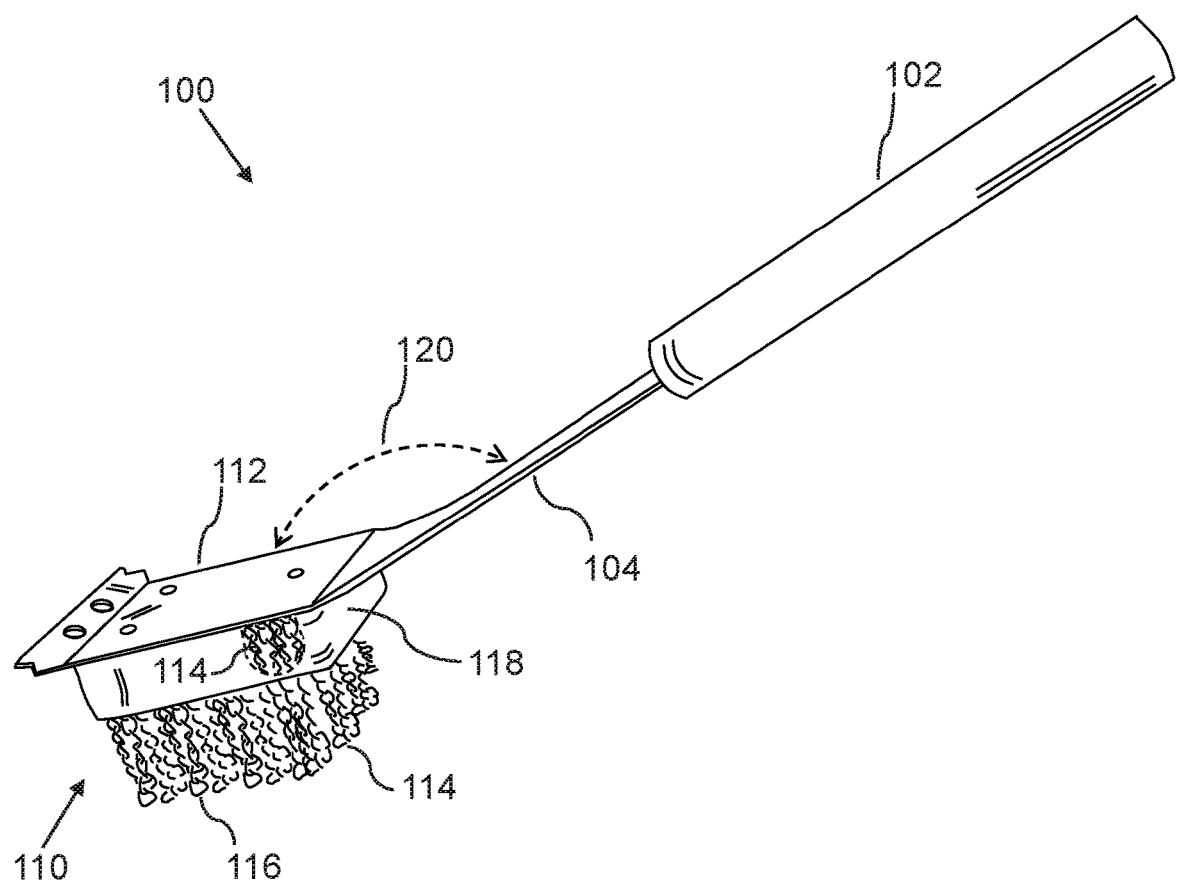
FIG. 1A is a perspective view of a barbeque chain brush, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a barbeque chain brush 100 with reference to FIG. 1A, in such manner that like reference numerals refer to like components throughout; a convention that we shall employ for the remainder of this specification.

Figure 1B:
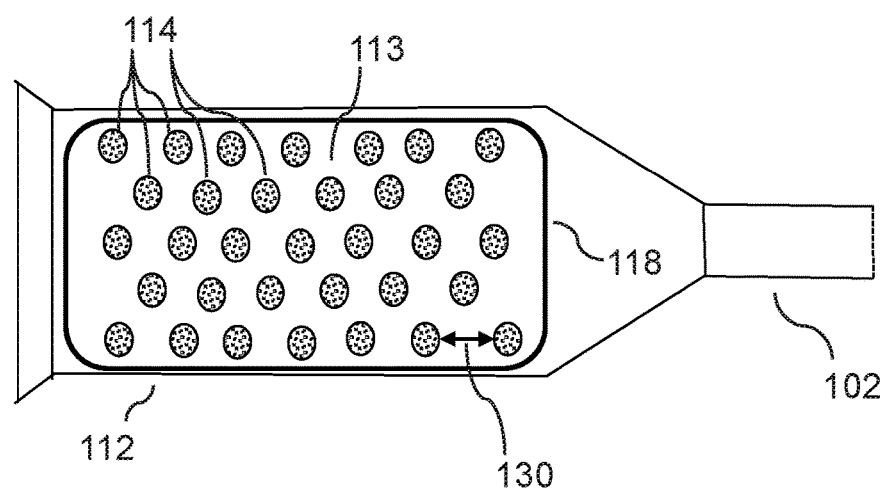
FIG. 1B is a bottom view of a brush head of a barbeque chain brush, according to an embodiment of the invention.

In an embodiment, as shown in FIGS. 1A and 1B, a barbeque chain brush 100 can include:
  a) a handle 102;
  b) a shaft 104, such that the handle is mounted on a first/inner end of the shaft 104; and
  c) a brush head 110, comprising:
    i. a brush head base 112, which can be connected to a second/outer end of the shaft 104, for example as shown, such that the shaft 104 and the brush head base 112 can be formed from one stamped piece of metal, such as stainless steel;
    ii. a plurality of chain segments 114, such that an upper end of each chain segment 114 is connected to the brush head base 112, such that each chain segment 114, comprises:
      i. a plurality of connected chain links 116;
  wherein the barbeque chain brush 100 can be used to scrub a surface 212 of a barbeque grill 210.

In a related embodiment, as shown in FIGS. 1A and 1B, the brush head 110, can further include a brush skirt 118, which is mounted around an upper part of the plurality of chain segments 114, such that the brush skirt 118 stabilizes the plurality of chain segments 114. FIG. 1A shows a cutout in the brush skirt 118, to show the chain segments 114 extending up to and connected to the bottom side 113 of the brush head base 112. The brush skirt 118 can for example be made from flexible plastic, tape, or heavy-duty fabric, or other flexible materials. Alternatively, the brush skirt 118 can be made from a substantially non-flexible metal or plastic skirt, such as a metal strip or metal wires encircling the plurality of chain segments 114.

In a related embodiment, the connection between the shaft 104 and the brush head base 112 can be straight, i.e. with a 180-degree connection angle 120, or can for example be configured with a connection angle 120 in a range of 120 to 175 degrees, or 125 to 160 degrees, in order to facilitate ergonomic use of the barbeque chain brush 100.

Figure 3A:
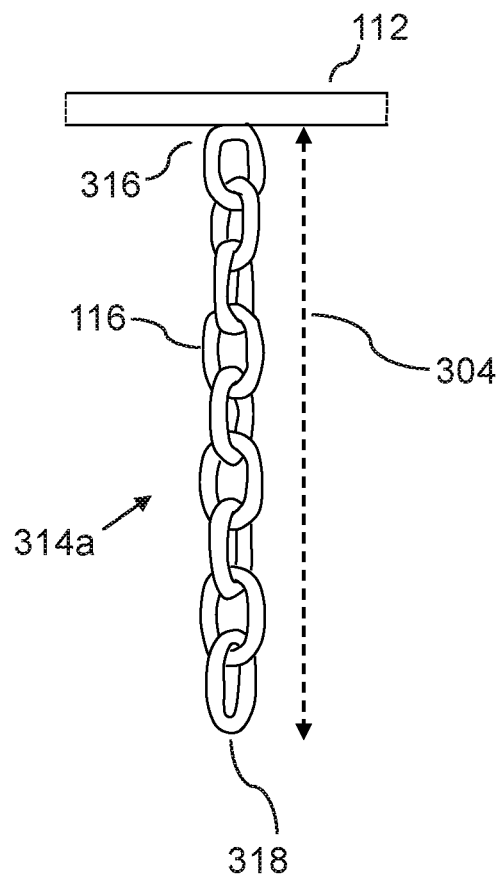
FIG. 3A is a side view of a single chain segment, according to an embodiment of the invention.
Figure 3B:
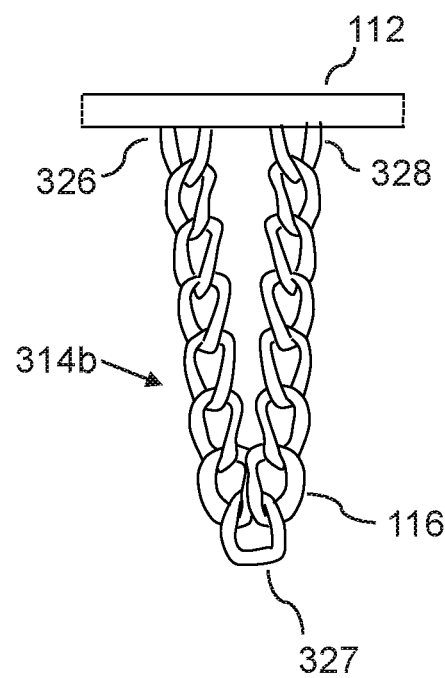
FIG. 3B is a side view of a double chain segment, according to an embodiment of the invention.

In a related embodiment, as shown in FIGS. 3A and 3B, each chain segment 114 can be configured as a single chain 314a, such that a first/upper end 316 of the single chain 314a is connected to the brush head base 112, and a second/lower end 318 of the single chain is exposed. Connections of the first/upper end 316 of the single chain 314a is connected to the brush head base 112.

In a related embodiment, as shown in FIG. 3B, each chain segment 114 can be configured as a double chain 314b, such that first and second ends 326 328 of the double chain 314b are connected to the brush head base 112, such that a middle part of the chain segment 114 is configured to be a lowest part 327 of the chain segment 114.

Figure 3C:
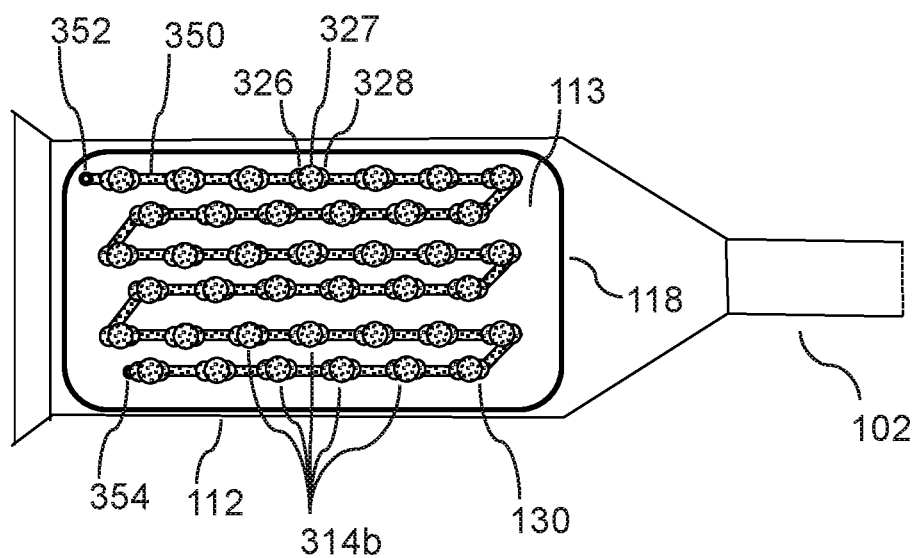
FIG. 3C is a bottom view of a brush head of a barbeque chain brush with double chain segments, according to an embodiment of the invention.

In a related embodiment, as shown in FIG. 3C, the plurality of double chain segments 114 can be configured as a single continuous chain 350 that is fastened at a plurality of point pairs 326 326 to the bottom side 113 of the brush head base 112, such that the single continuous chain 350 can be connected to the bottom side 113 of the brush head base 112 in a first end 352 and in a second end 354, with intermediate double chain segments 314b connected to the brush head base 112 in first and second ends 326 328 of each intermediate double chain segment 314b.

In related embodiment, the ends 316 326 328 352 354 of the chain segments 314a 314b or the single continuous chain 350 can be connected to the brush head base 112 with staples 352 354, rivets 352 354, clamps 352 354, and other well-known connection methods and devices.

Figure 4A:
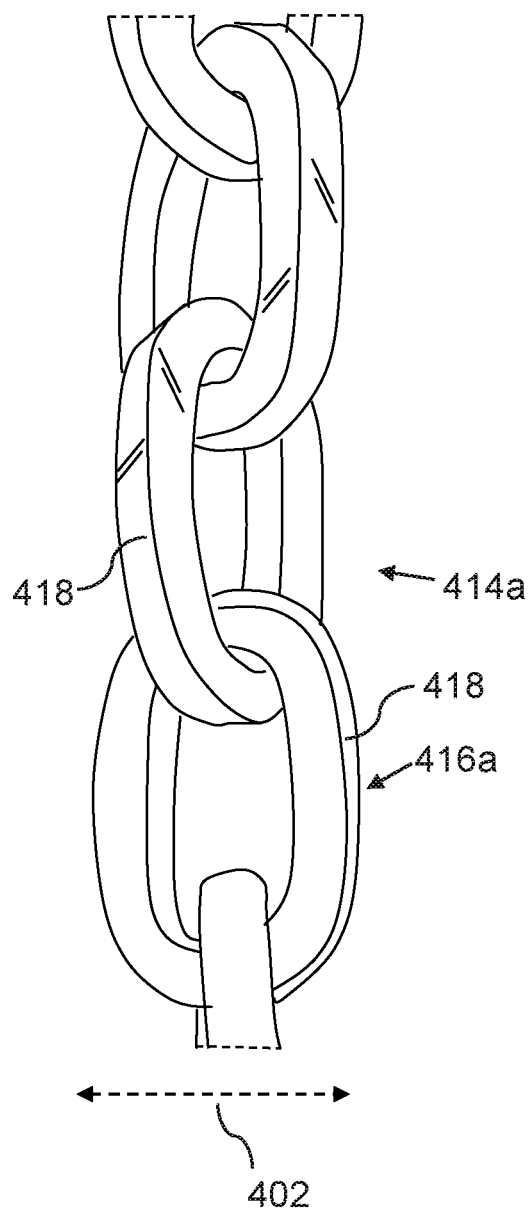
FIG. 4A is a side view of a square chain segment, according to an embodiment of the invention.

In another related embodiment, each connected chain link 416a of a chain segment 414a can be made from square wire, as shown in FIG. 4A, wherein the square wire is configured with sharp edges 418, which can effectively scrape off grease and dirt from a surface of a barbeque grill.

Figure 4B:
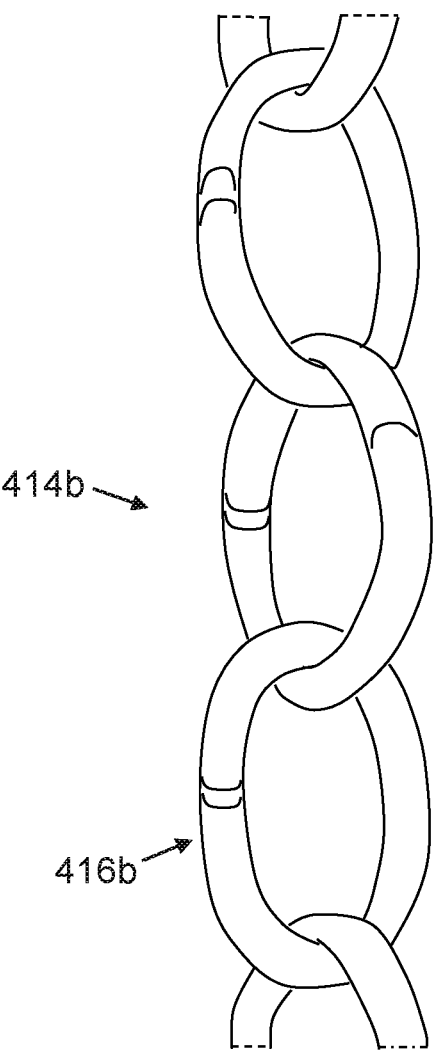
FIG. 4B is a side view of a round chain segment, according to an embodiment of the invention.

In another related embodiment, each connected chain link 416b of a chain segment 414b can be made from round wire, as shown in FIG. 4B, wherein the round wire is configured to provide a rounded surface that can remove grease and dirt from a surface of a barbeque grill, while minimizing risk of creating scratch marks and scuffs on the surface of the barbeque grill.

In various embodiments, the chain segments 114 can be configured with a wire thickness 402, as shown in FIG. 4A, in a range of for example 1-3 mm, 1-4 mm, 1-5 mm, 1.5-3.5 mm, 2-4 mm, or 1.5-5 mm, or some other such that each chain segment 114 is relatively heavy and dense, such as to avoid the open areas of the links getting clogged with grease and may cause the chain to clump up in a single mass instead of moving freely and separately. Such a relatively heavy and dense chain segments 114 configuration ensures that the chain segments 114 remain as free and separate as possible in order to fit down between the grate wires of the barbeque grill, such that the chain segments 114 clean both between the grate wires and on a top of the grate wires.

In other embodiments, a density of the chain segments 114 in relation to each other, as measured by an average distance between chain segments 114, or as the number of connected chain segments per surface area of a lower side of the brush head base 112 can be configured for example with an average distance 130, as indicated in FIG. 1B, between adjacent chain segments in a range of 2-30 mm, 5-20 mm, 3-30 mm, 3-30 mm, 5-30 mm, or 10-20 mm. When many chain segments 114 are densely packed together, the brush is heavy and doesn't move over obstacles like grill grate handles or crossed grate wires easily, but when too few chain segments 114 are used, and the density is lower, the ability of the brush to clean between the wires is reduced, as the chain hangs more loosely between the grate wires and does not forcibly scrape against the sides of the dirty grate wires.

In a related embodiment, the chain segments 114 can be manufactured from a substantially non-corrosive metal, such as for example stainless steel, in order to increase durability for a tool that is used mainly outdoors.

In a related embodiment, as shown in FIGS. 3A and 3B, the chain segments 114 can be configured with a length 304, from an upper part 316 326 to a lower part 318 327 for example in a range of 10-80 mm, 10-65 mm, 10-60 mm, 20-80 mm, 25-65 mm, or 30-60 mm. Chain segments 114 that are too short don't penetrate between grate wires 214 effectively, and chain segments 114 that are too long catch in the grate wires 214 and don't move over the grate wires 214 easily.

Figure 5A:
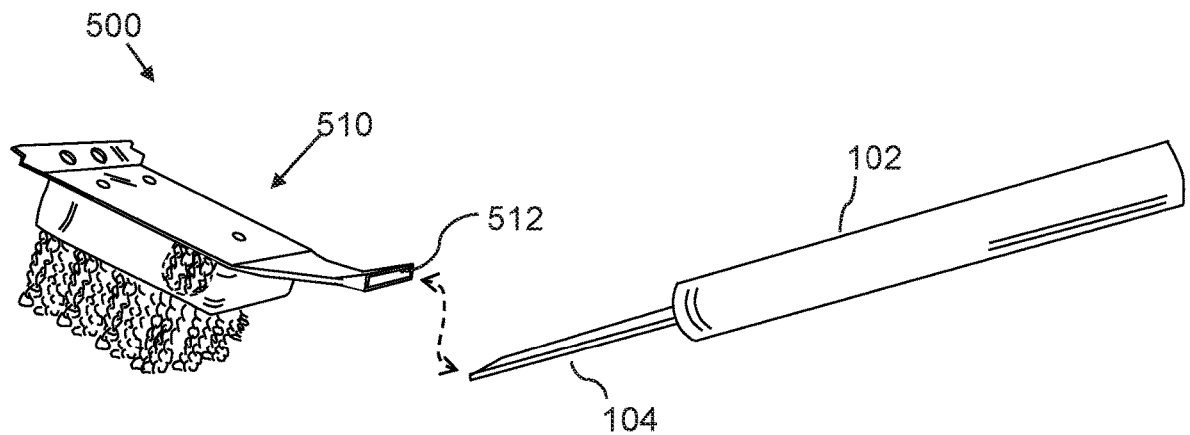
FIG. 5A is a perspective view of a barbeque chain brush with the brush head disconnected, according to an embodiment of the invention.
Figure 5B:
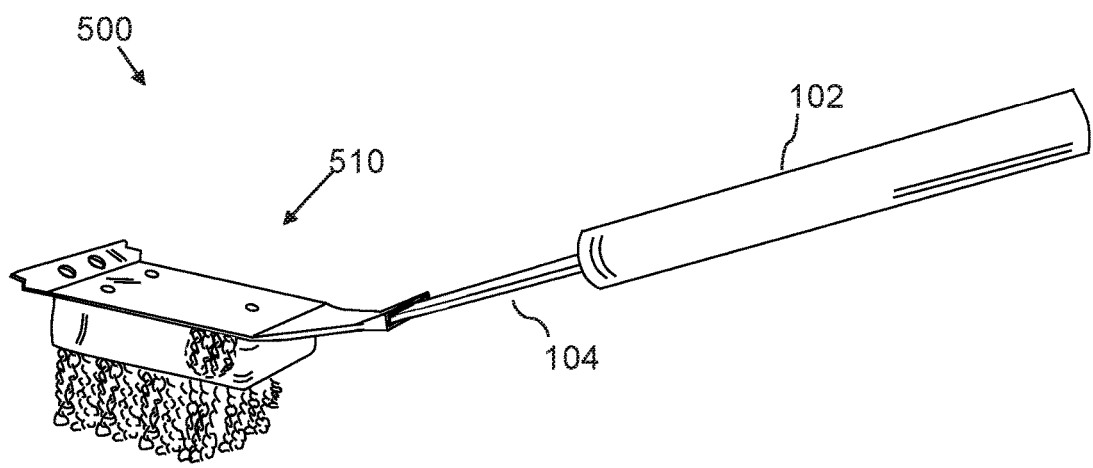
FIG. 5B is a perspective view of a barbeque chain brush with the brush head connected, according to an embodiment of the invention.

In a related embodiment, as shown in FIGS. 5A and 5B, the brush head 510 can be removably connectable to the shaft 104, such that the brush head 510 can be disconnected from the shaft 104, as shown in FIG. 5B. This can for example be useful to replace a worn-out or defective brush head 510 with a new brush head 510, or in order to switch between different types of brush heads 510.

In further related embodiments, the shaft 104 can be configured to slide into a connection aperture 512 of a rear end of the brush head 510, as shown in FIGS. 5A and 5B, for example via a ferrule or spigot type of connection structure, or alternatively the rear end of the brush head 510 can be configured to slide into the shaft 104.

In related embodiments, functional benefits of the barbeque chain brush 100 can include that:
a) the barbeque chain brush 100 is unlikely to lose any pieces of chain segments 114 or individual links;
b) even in the unlikely event that a piece of chain 114 is eaten, it would be easily detected in the mouth and not swallowed;
c) even if swallowed, the chain pieces 114 or links 116 easily pass through the human body without causing damage;
d) the barbeque chain brush 100 never wears out or becomes matted;
e) the barbeque chain brush 100 can also be easily cleaned by hand or in a dishwasher and used again like new; and
f) the barbeque chain brush 100 cleans more effectively than bristle brushes. The chain segments 114 penetrate between the wires of the grate and clean the sides of the grate wires, while continuing to clean the tops of the grate wires at the same time.

Thus, in an embodiment, a barbeque chain brush 100, can include:
a) a shaft 102, which is an elongated piece; and
b) a brush head 110, which can include:
  a plurality of chain segments 114, such that an upper end of each chain segment is connected to an outer/distal portion of the shaft 102, such that each chain segment 114, comprises:
    a plurality of connected chain links 116;
such that the barbeque chain brush 100 is configured to be used to scrub a surface 212 of a barbeque grill 200.

Therefore, in related embodiments, the barbeque chain brush 100 can include embodiments wherein:
a) the brush head 110 further includes a brush head base 112, which can be connected to the outer/distal portion of the shaft 104, such that such that an upper end of each chain segment is connected to a distal end of the shaft via the brush head base;
b) the shaft 102 is uniformly cylindrical from an inner/proximal end to the outer/distal end, wherein an upper end of each chain segment is connected directly to at least a part of the distal portion, or in some cases around an entire circumference and outer end of the distal/outer portion of the shaft 102; or
c) an outer distal portion of the shaft 102 can have some other shape, such as substantially flat or ellipsoid, which can be different from a shape of the proximal portion of the shaft, wherein an upper end of each chain segment is connected directly to at least a part of the distal portion, or in some cases around an entire circumference and outer end of the distal/outer portion of the shaft 102.

Here has thus been described a multitude of embodiments of the barbeque chain brush 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the methods of attaching the chain segments 114 to the brush head base 112, using a variety of attachment methods and structures. Further, the chain segments 114 can be attached directly to an outer end of the handle, such that there is no separate brush head base 112, or the brush head base 112 can be a more complex piece with additional structure.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A barbeque chain brush, comprising:
a brush head, comprising:
  a brush head base; and
  a plurality of chain segments, such that an upper end of each chain segment is connected to the brush head base, such that each chain segment, comprises:
    a plurality of connected chain links;
  wherein each chain segment in the plurality of chain segments is configured as a double chain, such that first and second ends of the double chain are connected to the brush head base, such that a middle part of the double chain is configured to be a lowest part of the double chain;
such that the barbeque chain brush is configured to be used to scrub a surface of a barbeque grill.

2. The barbeque chain brush of claim 1, further comprising:
a) a handle; and
b) a shaft, such that the handle is mounted on a first end of the shaft;
wherein the brush head base is connected to a second end of the shaft.

3. The barbeque chain brush of claim 2, wherein the shaft and the brush head base are formed from one stamped piece of metal.

4. The barbeque chain brush of claim 1, further comprising:
a brush skirt, which is mounted around an upper part of the plurality of chain segments;
such that the brush skirt is configured to stabilize the plurality of chain segments.

5. The barbeque chain brush of claim 2, wherein the barbeque chain brush is configured with a connection angle, between the shaft and the brush head base, in a range of 120 to 175 degrees.

6. The barbeque chain brush of claim 1, wherein the plurality of chain segments is configured as a single continuous chain, such that first and second ends of the single continuous chain are connected to the brush head base.

7. The barbeque chain brush of claim 1, wherein each connected chain link in the plurality of connected chain links is made from square wire, wherein the square wire is configured with sharp edges.

8. The barbeque chain brush of claim 1, wherein each connected chain link in the plurality of connected chain links is made from a round wire, wherein the round wire is configured with a rounded surface.

9. The barbeque chain brush of claim 1, wherein each chain segment in the plurality of chain segments is configured with a wire thickness in a range of 1.5-5 mm.

10. The barbeque chain brush of claim 1, wherein the plurality of chain segments is configured with an average distance between adjacent chain segments in a range of 3-30 mm.

11. The barbeque chain brush of claim 1, wherein each chain segment in the plurality of chain segments is configured with a length, from an upper part to a lower part in a range of 10-65 mm.

12. The barbeque chain brush of claim 1, wherein the brush head is configured to be removably connectable to the shaft, such that the brush head is configured to be disconnectable from the shaft.

13. The barbeque chain brush of claim 12, wherein a rear end of the brush head further comprises a connection aperture, such that the shaft is configured to slide into the connection aperture to connect the brush head with the shaft.

14. A barbeque chain brush, comprising:
   a) a shaft, which is an elongated piece; and
   b) a brush head, comprising:
      a plurality of chain segments, such that an upper end of each chain segment is connected to a distal portion of the shaft, such that each chain segment, comprises:
         a plurality of connected chain links;
      wherein each chain segment in the plurality of chain segments is configured as a double chain, such that first and second ends of the double chain are connected to the brush head base, such that a middle part of the double chain is configured to be a lowest part of the double chain;
      wherein the plurality of chain segments is configured as a single continuous chain, such that first and second ends of the single continuous chain are connected to the brush head base;
   such that the barbeque chain brush is configured to be used to scrub a surface of a barbeque grill.

15. The barbeque chain brush of claim 14, wherein each connected chain link in the plurality of connected chain links is made from square wire, wherein the square wire is configured with sharp edges.

16. The barbeque chain brush of claim 14, wherein each connected chain link in the plurality of connected chain links is made from a round wire, wherein the round wire is configured with a rounded surface.

17. The barbeque chain brush of claim 14, wherein the plurality of chain segments is configured with an average distance between adjacent chain segments in a range of 3-30 mm.

18. The barbeque chain brush of claim 14, wherein the brush head is configured to be removably connectable to the shaft, such that the brush head is configured to be disconnectable from the shaft.

19. The barbeque chain brush of claim 18, wherein a rear end of the brush head further comprises a connection aperture, such that the shaft is configured to slide into the connection aperture to connect the brush head with the shaft.

20. A barbeque chain brush, comprising:
   a brush head, comprising:
      a brush head base; and
      a plurality of chain segments, such that an upper end of each chain segment is connected to the brush head base, such that each chain segment, comprises:
         a plurality of connected chain links;
      wherein each chain segment in the plurality of chain segments is configured as a double chain, such that first and second ends of the double chain are connected to the brush head base, such that a middle part of the double chain is configured to be a lowest part of the double chain;
      wherein the plurality of chain segments is configured as a single continuous chain, such that first and second ends of the single continuous chain are connected to the brush head base;
      wherein each connected chain link in the plurality of connected chain links is made from square wire, wherein the square wire is configured with sharp edges;
   such that the barbeque chain brush is configured to be used to scrub a surface of a barbeque grill.

* * * * *